(12) United States Patent
Sunkara et al.

(10) Patent No.: US 8,920,970 B2
(45) Date of Patent: Dec. 30, 2014

(54) ANODE MATERIALS FOR LITHIUM-ION BATTERIES

(75) Inventors: Mahendra Kumar Sunkara, Louisville, KY (US); Praveen Meduri, Louisville, KY (US); Gamini Sumanasekera, Louisville, KY (US)

(73) Assignee: University of Louisville Research Foundation, Louisville, KY (US)

( * ) Notice: Subject to any disclaimer, the term of this patent is extended or adjusted under 35 U.S.C. 154(b) by 70 days.

(21) Appl. No.: 12/650,081

(22) Filed: Dec. 30, 2009

(65) Prior Publication Data

US 2012/0028124 A1 Feb. 2, 2012

Related U.S. Application Data

(60) Provisional application No. 61/141,502, filed on Dec. 30, 2008.

(51) Int. Cl.
| | |
|---|---|
| *H01M 4/02* | (2006.01) |
| *H01M 4/1395* | (2010.01) |
| *H01M 4/58* | (2010.01) |
| *H01M 4/62* | (2006.01) |

(52) U.S. Cl.
CPC ............ *H01M 4/625* (2013.01); *H01M 4/1395* (2013.01); *Y02E 60/122* (2013.01); *H01M 4/581* (2013.01)
USPC ......................................... 429/209; 429/244

(58) Field of Classification Search
USPC ................................ 429/209, 244
See application file for complete search history.

(56) References Cited

U.S. PATENT DOCUMENTS

| | | | |
|---|---|---|---|
| 2007/0111102 A1* | 5/2007 | Inoue et al. | 429/232 |
| 2008/0044732 A1* | 2/2008 | Salot et al. | 429/322 |
| 2008/0153000 A1* | 6/2008 | Salot et al. | 429/218.1 |

OTHER PUBLICATIONS

Arico et al., "Nanostructured Materials for Advanced Energy Conversion and Storage Devices," Nat. Mater., vol. 4(5), 2005, pp. 366-377.
Boukamp et al., "All-Solid Lithium Electrodes With Mixed-Conductor Matrix," J. Electrochem. Soc., vol. 28(4), 1981, pp. 725-729.
Derrien et al., "Nanostructured Sn-C Composite as an Advanced Anode Material in High-Performance Lithium-Ion Batteries," Adv. Mater., vol. 19(17), 2007, pp. 2336-2340.
Idota et al., "Tin-Based Amorphous Oxide: A High-Capacity Lithium-Ion-Storage Material," Science, vol. 276(5317), 1997, pp. 1395-1397.
Kim et al., "Highly Conductive Coaxial $SnO_2$-$In_2O_3$ Heterostructured Nanowires for Li Ion Battery Electrodes," Nano Lett., vol. 7(10), 2007, pp. 3041-3045.
Kumar et al., "Gas-Phase, Bulk Production of Metal Oxide Nanowires and Nanoparticles Using a Microwave Plasma Jet Reactor," J. Phys. Chem. C., vol. 112(46), 2008, pp. 17750-17754.

(Continued)

*Primary Examiner* — Jane Rhee
(74) *Attorney, Agent, or Firm* — Eric Castlen; Joan Simunic; Terry Wright

(57) ABSTRACT

An anode material for lithium-ion batteries is provided that comprises an elongated core structure capable of forming an alloy with lithium; and a plurality of nanostructures placed on a surface of the core structure, with each nanostructure being capable of forming an alloy with lithium and spaced at a predetermined distance from adjacent nanostructures.

18 Claims, 9 Drawing Sheets

(56) References Cited

OTHER PUBLICATIONS

Li et al., "A High-Rate, High-Capacity, Nanostructured Sn-Based Anode Prepared Using Sol-Gel Template Synthesis," J. Electrochem. Soc., vol. 148(2), 2001, pp. A164-A170.

Morimoto et al., "Anode Behavior of Electroplated Rough Surface Sn Thin Films for Lithium-Ion Batteries," J. of Power Sources, vol. 146(1-2), 2005, pp. 469-472.

Park et al., "Preparation and Electrochemical Properties of SnO2 Nanowires for Application in Lithium-Ion Batteries," Angew. Chem. Int. Ed., vol. 46(5), 2007, pp. 750-753.

Poizot et al., "Nano-Sized Transition-Metal Oxides as Negative-Electrode Materials for Lithium-Ion Batteries," Nature, vol. 407(6803), 2000, pp. 496-499.

Sandu et al., "The Chemical Changes Occurring Upon Cycling of a SnO2 Negative Electrode for Lithium Ion Cell: In Situ Mössbauer Investigation," J. Solid State Chem, Vo. 179(2), 2006, pp. 476-485.

Sivashanmugam et al., "Electrochemical Behaviour of Sn/SnO2 Mixtures for Use as Anode in Lithium Rechargeable Batteries," J. Power Sources, vol. 144, 2005, pp. 197-203.

Taberna et al., "High Rate Capabilities Fe3O4-based Cu Nano-Architectured Electrodes for Lithium-Ion Battery Applications," Nat. Mater., vol. 5(7), 2006, pp. 567-573.

Wang et al., "Molten Salt Synthesis of Tin Oxide Nanorods: Morphological and Electrochemical Features," J. Phys. Chem. B., vol. 108(46), 2004, pp. 17832-17837.

Ying et al., "Characterization of SnO2. Nanowires as an Anode Material for Li-Ion Batteries," Appl. Phys. Lett., vol. 87(11), 2005, p. 113108.

Wang et al., "Nanostructured Hybrid Silicon/Carbon Nanotube Heterostructures: Reversible High-Capacity Lithium-Ion Anodes," ACS Nano, vol. 4(4), 2010, pp. 2233-2241.

Zhou et al., "Si/TiSi2 Heteronanostructures as High-Capacity Anode Material for Li Ion Batteries," Nano Lett., vol. 10, 2010, pp. 860-863.

Meduri et al., "Nanowire based anodes for lithium Ion batteries," Abstract and slide presentation presented at 2007 AIChE Annual Meeting, Salt Lake City, UT, Nov. 5, 2007.

Meduri et al., "Nanowire based anodes for lithium Ion batteries," Abstract and slide presentation presented at 212th ECS Meeting, Washington, D.C., Oct. 7, 2007.

Meduri et al., "Hybrid architectures as high capacity anodes for Li-ion batteries," presented at Engineering Expo at the University of Louisville, Mar. 2008, and at Kentucky Nanomat Workshop, Louisville, KY, Mar. 2008.

* cited by examiner

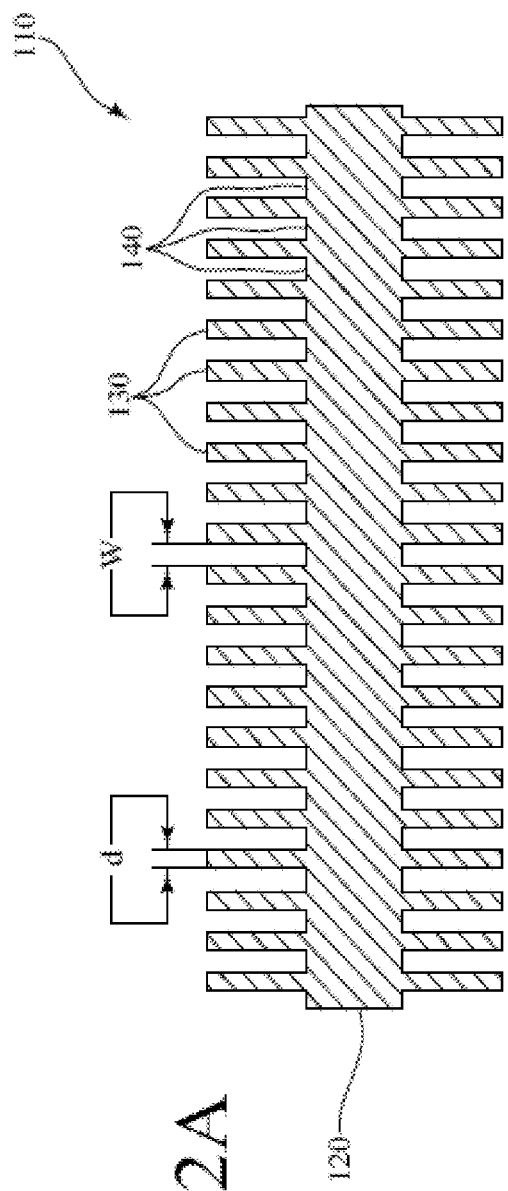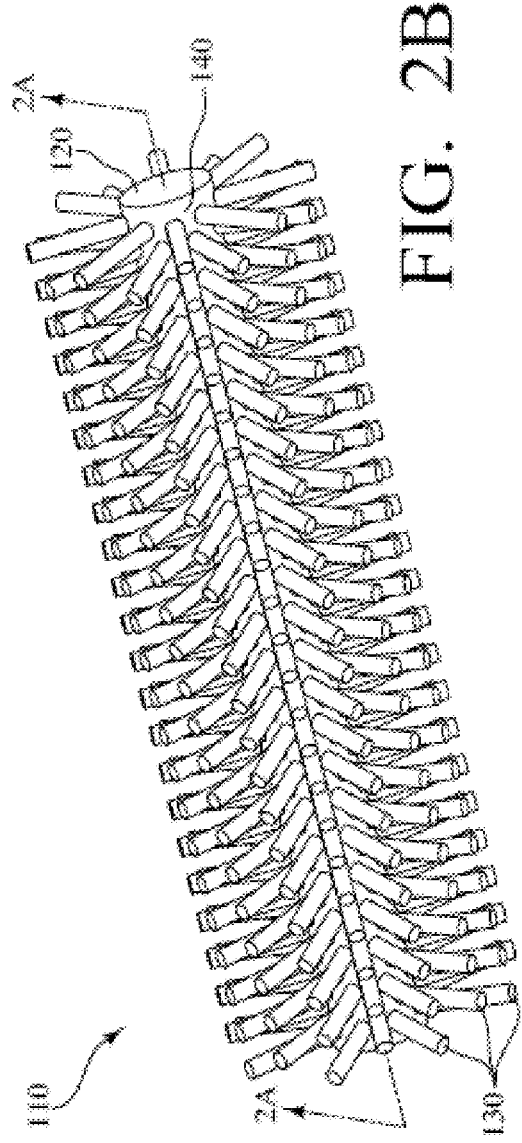

ANODE MATERIALS FOR LITHIUM-ION BATTERIES

RELATED APPLICATIONS

This application claims priority from U.S. Provisional Application Ser. No. 61/141,502, filed Dec. 30, 2008, the entire disclosure of which is incorporated herein by this reference.

GOVERNMENT INTEREST

Subject matter described herein was made with U.S. Government support under Grant Numbers DE-FG02-05ER64071 and DE-FG02-07ER46375 awarded by the U.S. Department of Energy. The government has certain rights in the described subject matter.

TECHNICAL FIELD

The presently-disclosed subject matter relates to anode materials for lithium-ion batteries. In particular, the presently-disclosed subject matter relates to anode materials for lithium-ion batteries that include an elongated core structure and a plurality of nanostructures, each of which are placed on the surface of the core structure and spaced at a distance from adjacent nanostructures.

BACKGROUND

Lithium-ion (Li-ion) batteries are rechargeable batteries that have become increasingly common in many consumer products because of their high energy-to-weight ratios, high energy density, and slow self-discharge when not in use. The three primary functional components of a Li-ion battery are an electrolyte, a cathode, and an anode. The electrolyte of a Li-ion battery typically includes a nonaqueous solution of a lithium salt, which is able to carry Li ions between the cathode and anode when the battery passes a current through a circuit. In this regard, the cathode of a Li-ion battery has been mainly formed from a layered oxide material (e.g., lithium cobalt oxide) and the anode material selected for many Li-ion batteries has predominantly been graphite. However, in order to produce Li-ion batteries that have a higher capacity and capacity retention over a number of charge/discharge cycles, researchers have begun investigating a variety of other materials for use as components of Li-ion batteries.

Recently, one dimensional nanowire (NW)-based materials have been identified as candidates for Li-ion battery electrodes due to their desirable characteristics, including: a faster charge transport, better conducting pathways, and good strain relaxation [1-3]. Indeed, silicon (Si) NW arrays, as well as NWs of cobalt oxide ($Co_3O_4$), iron oxide ($Fe_2O_3$), and tin oxide ($SnO_2$) in a bulk powder form have been shown to retain over 75% of their maximum capacity over ten (10) charge/discharge cycles, and thus hold promise as potential materials for Li-ion battery electrodes [5-8]. However, despite the potential ability of these materials to serve as electrodes, the stability of these materials during cycling either remains unknown, or in some cases, is significantly limited (e.g., capacity fading after about 30-50 cycles).

Of the various metal and metal oxide systems that have been used as anode materials for Li-ion batteries, both Sn and $SnO_2$ are interesting because of their concurrent semi-conducting properties and high capacity capabilities (Sn: 994 $mAhg^{-1}$ and $SnO_2$: 781 $mAhg^{-1}$), compared to that of graphite (372 $mAhg^{-1}$) [11-12]. Notwithstanding the certain apparent benefits that are associated with these metal and metal oxide systems though, significant capacity fading with cycling is still a specific problem in these systems, largely due to enormous volume changes that occur during Li alloying and de-alloying, which subsequently leads to metal segregation and crystallographic deformation [13]. For example, in the case of Sn, the metal segregation and crystallographic deformation has been observed to be as high as 259% [14].

In light of the identified capacity fading drawbacks associated with the above-identified materials, there has been a recent interest in further investigating the use of nanowire-based oxide materials to improve the capacity fading characteristics that are associated with many of these anode materials. Recent studies have shown that $SnO_2$ nanowires and heterostructured $SnO_2/In_2O_3$ nanowires retain a capacity of around 700 $mAhg^{-1}$ for up to 15 cycles, but the capacity still quickly fades to approximately 300 $mAhg^{-1}$ after 50 cycles. Similarly, $SnO_2$ nanorods have been investigated as an anode material, but, again, these materials have also shown a capacity that fades to approximately 400 $mAhg^{-1}$ after 60 cycles.

In any event, and although the above-described studies have indicated that nanoscale tin oxide-based materials may have certain beneficial characteristics that allow them to be used as anode materials in Li-batteries, current research still indicates that these materials exhibit low capacities that range from approximately 300-620 $mAhg^{-1}$ after only 50 cycles. As such, an anode material for a lithium battery has yet to be provided that not only remains stable over a number of charge/discharge cycles, but that also exhibits high-capacity retention during cycling.

SUMMARY

The presently-disclosed subject matter includes anode materials for lithium-ion (Li-ion) batteries that exhibit enhanced stability and high-capacity retention over a number of charge/discharge cycles.

In some embodiments, an anode material for a Li-ion battery is provided that includes an elongated core structure that is capable of forming an alloy with lithium and a plurality of nanostructures, each of which is placed on a surface of the core structure. In these embodiments, each nanostructure is also capable of forming an alloy with lithium and is spaced at a predetermined distance from adjacent nanostructures such that the nanostructures are subsequently able to accommodate the volume expansion that occurs during lithiation and delithiation (i.e., Li alloying and de-alloying).

In one exemplary embodiment of the presently-disclosed anode materials, the core structure is a metal oxide nanowire, such as a tin oxide ($SnO_2$), a tungsten trioxide ($WO_3$), or a molybdenum oxide ($MoO_3$) nanowire. In other embodiments, the core structure is a carbon-based material, such as a carbon nanotube or a carbon microtube.

In some embodiments, the nanostructures, which are placed on the surface of the core structure, are comprised of silicon (Si), germanium (Ge), tin (Sn), or a Si and Ge alloy. Each of these materials is capable of forming an alloy with lithium and can be placed on a surface of the core structure to provide an anode material for a lithium ion battery. Furthermore, each of those materials can be placed on the surfaces of the core structures such that the available surface area on the anode materials is increased and the net amount of Li alloying and de-alloying that may occur during charge and discharge cycles is increased as well. In some embodiments, the plurality of nanostructures comprise nanoclusters that are placed on the surface of the core structure and spaced at a predetermined distance from adjacent nanoclusters. In other embodiments, the plurality of nanostructures comprises nanowires that are placed on the surface of the core structure and spaced at a predetermined distance from adjacent nanowires.

In some embodiments, the nanostructures of the presently-disclosed anode materials are spaced at a predetermined distance from adjacent nanostructures in order to accommodate volume expansion during alloying and prevent agglomeration of the nanostructures, which may otherwise occur if the nanostructures are not spaced properly on the core structure. In some embodiments, the distance between adjacent nanostructures is about 1 to about 2.5 times the diameter of the nanostructure, which, in some embodiments, is less than about 50 nm.

In some embodiments, the plurality of nanostructures are placed on the core structures of the anode materials such that the distance between adjacent nanostructures is large enough to accommodate the volume expansion that a particular material will undergo during lithiation. For example, in embodiments where the plurality of nanostructures are comprised of tin, the tin nanostructures are placed on the core structure such that the distance between each tin nanostructure is about 1.4 times the diameter of the nanostructure. As another example, in embodiments where the plurality of nanostructures are comprised of silicon, the distance between each silicon nanostructure is about 1.71 times the diameter of the nanostructure. As yet another example, in embodiments where the nanostructures are comprised of germanium, the distance between each germanium nanostructure is about 1.65 times the diameter of the nanostructure.

Thus, the anode materials of the presently-disclosed subject matter allow for the placement of a variety of different nanostructures on a core structure such that each nanostructure can expand in volume during a lithiation process and prevent agglomeration, while still providing an increased surface area for Li alloying and de-alloying. Furthermore, by spacing the nanostructures at predetermined distances from one another, the anode materials of the presently-disclosed subject matter are able to retain their morphology and conductivity over multiple charge/discharge cycles to thereby provide an stable anode material with high-capacity retention.

BRIEF DESCRIPTION OF THE DRAWINGS

FIGS. 2A-2B are a cross-sectional view and a perspective view, respectively, of another exemplary anode material for a lithium-ion battery, which includes a core structure and a plurality of nanowires, with the nanowires placed on the surface of the core structure and spaced at a distance from adjacent nanoclusters.

DESCRIPTION OF EXEMPLARY EMBODIMENTS

The presently-disclosed subject matter includes anode materials for lithium-ion (Li-ion) batteries and, more specifically, anode materials for Li-ion batteries that include an elongated core structure and a plurality of nanostructures, each of which are placed on the surface of the core structure and spaced at a distance from adjacent nanostructures.

Figure 1A:
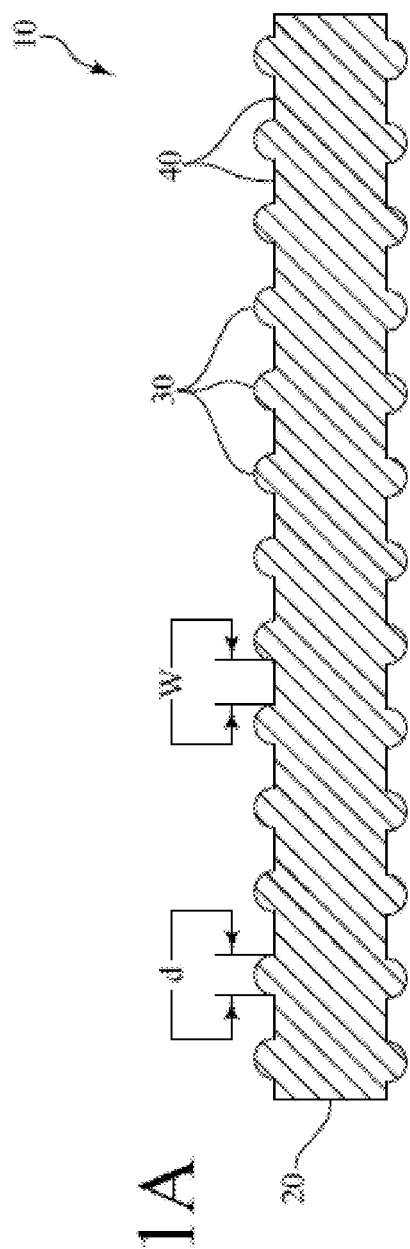
FIGS. 1A-1B are a cross-sectional view and a perspective view, respectively, of an exemplary anode material for a lithium-ion battery, which includes a core structure and a plurality of nanoclusters, with the nanoclusters placed on the surface of the core structure and spaced at a distance from adjacent nanoclusters.
Figure 1B:
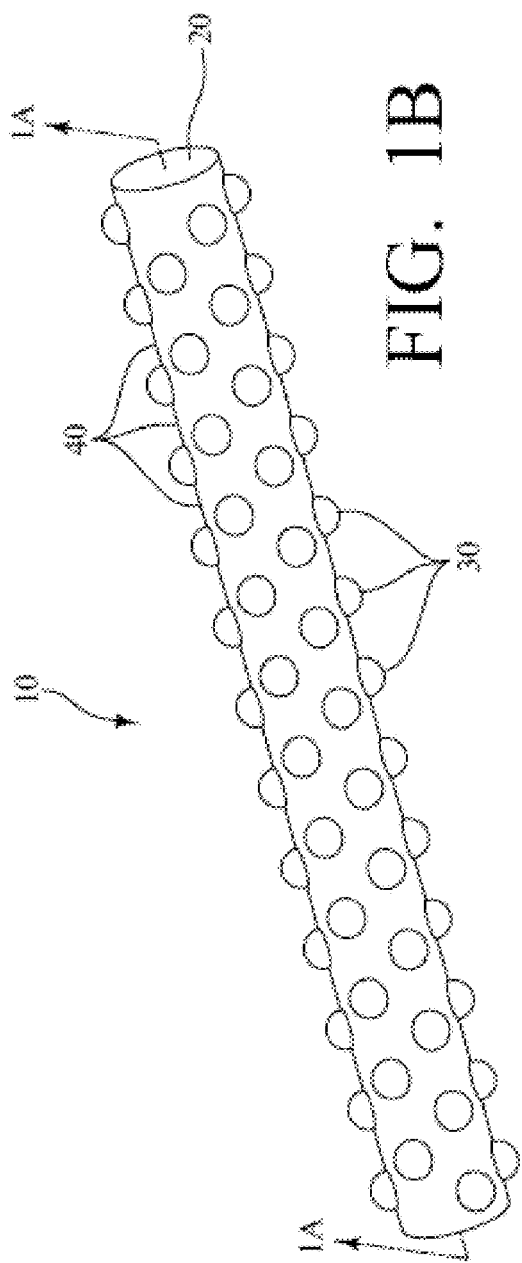

FIGS. 1A and 1B are cross-sectional and perspective views, respectively, of an exemplary anode material 10 in accordance with the presently-disclosed subject matter. In this exemplary embodiment, the anode material 10 is comprised of an elongated core structure 20 and a plurality of nanostructures 30. As shown in FIGS. 1A and 1B, the nanostructures 30 are placed on a surface 40 of the core structure 20 and are spaced at a predetermined distance from adjacent nanostructures 30. By placing the plurality of nanostructures 30 on the surface 40 of the core structure 20 and spacing each nanostructure 30 at a predetermined distance from adjacent nanostructures 30, the nanostructures 30 not only allow the surface area of the anode material 10 to be increased, but adequate space is provided for the nanostructures 30 to expand in volume during Li alloying and de-alloying (i.e. lithiation and delithiation), as described in further detail below.

As shown in FIGS. 1A and 1B, the core structure 20 of the exemplary anode material 10 is an elongated structure in the shape of a wire or cylinder. The core structure 20 can be fabricated from a variety of materials that are capable of forming an alloy with Li to thus provide an anode material that can effectively be used in a Li-ion battery. In some embodiments, the core structure 20 of the exemplary anode material 10 is a metal oxide nanowire, such as a tin oxide ($SnO_2$) nanowire, a tungsten trioxide ($WO_3$) nanowire, or a molybdenum oxide ($MoO_3$) nanowire. In other embodiments, the core structure 20 is a carbon-based material, such as a carbon nanotube or a carbon microtube. Of course, as will be recognized by those of ordinary skill in the art, other metal oxide nanowires and carbon-based materials capable of forming an alloy with Li can also be used to fabricate an exemplary anode material without departing from the spirit and scope of the subject matter disclosed herein.

As noted, the core structure 20 of the exemplary anode material 10 shown in FIGS. 1A and 1B can be a metal oxide nanowire. Such metal oxide nanowires can be synthesized according to a variety of methods known to those of ordinary skill in the art. For example, in some embodiments, metal oxide nanowires can be synthesized using a process in which metal powders (e.g., tin (Sn) powder) are reacted directly in a gas phase with oxygen containing plasma to form metal oxide nanowires (e.g., $SnO_2$ nanowires). Such a process is described in commonly assigned and co-pending U.S. patent application Ser. No. 12/248,731, filed on Oct. 9, 2008, which is incorporated herein by this reference. By using such a process, metal oxide nanowires can be formed that are substantially free or completely free of foreign metal contamination, which could otherwise hinder the electrochemical performance of the nanowires and reduce their ability to be used as part of an anode material of the presently-disclosed subject matter.

In other embodiments, metal oxide nanowires, such as tungsten trioxide ($WO_3$) nanowires or molybdenum oxide ($MoO_3$) nanowires, can be synthesized by growing the nanowires directly on a stainless steel substrate, which subsequently gives rise to sufficient conduction using a hot filament chemical vapor deposition (CVD) reactor. In this system, the stainless steel substrates are placed at a distance from the hot metal filament, and the various metal oxide species (e.g., $MoO_3$) are introduced into the system and transported using oxygen, such that the metal oxide is then deposited onto the substrate and subsequently forms a metal oxide nanowire. By using such a system, the density, morphology, and diameter of the resulting nanowires can further be controlled by varying the substrate temperature and the oxygen flow into the system in order to produce a desired nanowire that can then be used as the core structure 20 of the exemplary anode material 10 shown in FIGS. 1A and 1B.

In yet further embodiments, and as noted above, the core structure 20 of the exemplary anode material 10 could be a carbon-based structure, such as a carbon nanotube or a carbon microtube. Suitable carbon nanotubes that can be used in accordance with the presently-disclosed subject matter include commercially available carbon nanotubes that can be purchased from companies such as Carbon Nanotechnologies, Inc. (Houston, Tex.) or Nanocyl Inc. (Sambreville, Belgium).

Suitable carbon microtubes that can be used as a core structure 20 in accordance with the presently-disclosed subject matter can be synthesized on a silicon wafer in a metal organic CVD reactor by employing a carrier gas and a trimethyl gallium precursor, as will be recognized by those of ordinary skill in the art. By using such a process, carbon microtubes can be synthesized such that the carbon microtubes include graphite edge planes and are hollow, unlike carbon nanotubes, with internal diameters of about 100 nm. Furthermore, by synthesizing carbon microtubes in such a manner, the carbon microtubes can be considered "thick" in the sense that they have more than one layer with a space between the layers that is capable of accommodating Li inside the respective layers. These thick layers, with spacing between the layers as well as hollow interiors, further allow for more Li storage and can lead to better Li diffusion into the carbon microtubes, such that the carbon microtubes can serve as a part of a high-capacity and stable anode material for a Li-ion battery.

Referring still to FIGS. 1A and 1B, once the core structure 20 has been synthesized, the nanostructures 30 can then be placed (i.e., applied) on the surface of the core structure 20. The term "nanostructure" is used herein to refer to nanoscale structures with various geometric configurations, but which typically have diameters of between 1 and 100 nm. Various nanostructures are known to those of ordinary skill in the art, including nanoclusters and nanowires, and can be used in accordance with the presently-disclosed anode materials.

Regardless of the particular nanostructure 30 that is chosen for the anode material 10, the nanostructure 30 that is chosen for the exemplary anode material 10 of the presently-disclosed subject matter is comprised of a material that is capable of forming an alloy with Li such that nanostructure 30 can be placed on the core structure 20 and effectively used as part of an anode material for a Li-ion battery. In some embodiments, the plurality of nanostructures 30 that are placed on the core structure 20 are comprised of metals and inorganic materials, such as silicon (Si), germanium (Ge), tin (Sn), or a Si and Ge alloy, in order to provide a nanostructure that is comprised of a material capable of forming an alloy with Li. Of course, as will be recognized by those of ordinary skill in the art and to the extent it may be desired, other materials capable of forming an alloy with Li can also be used to provide a suitable nanostructure without departing from the spirit and scope of the subject matter disclosed herein.

In some embodiments of the presently-disclosed anode materials for Li-ion batteries, and as illustrated in FIGS. 1A and 1B, the plurality of nanostructures 30 that are placed on the core structure 20 are nanoclusters. The term "nanocluster" is used herein to refer to a grouping (i.e., a cluster) of nanoparticles that has a diameter that is typically less than 100 nm. Various methods can be used in accordance with the presently-disclosed subject matter to place the plurality of nanoclusters on the surface 40 of the core structure 20. For example, in embodiments where the core structure 20 is a metal oxide nanowire, nanoclusters can be placed on the surface 40 of the metal oxide nanowires (e.g., $SnO_2$ nanowires) by exposing the nanowires to hydrogen ($H_2$) plasma in a microwave CVD reactor to produce metal nanoclusters (e.g., Sn nanoclusters) on the nanowire surfaces. As another example, in embodiments where the core structure 20 is a carbon-based structure, such as a carbon nanotube or a carbon microtube, Si or Ge nanoclusters can be placed on the surface 40 of the carbon nanotubes or carbon microtubes by CVD techniques in which silane gas is used for the deposition of Si nanoclusters and germane gas is used for the deposition of Ge nanoclusters, respectively.

Referring now to FIGS. 2A and 2B, in another exemplary anode material 110 of the presently-disclosed subject matter, the anode material 110 is again comprised of an elongated core structure 120 and a plurality of nanostructures 130. Similar to the exemplary anode material shown in FIGS. 1A and 1B, the plurality of nanostructures 130 are placed on a surface 140 of the core structure 120, with each nanostructure 130 spaced at a predetermined distance from adjacent nanostructures 130. However, in this exemplary embodiment, the plurality of nanostructures 130 of the anode material 110 are nanowires, which, in some embodiments, are up to several microns in length such that sufficient conduction is obtained along the nanowires.

Nanowires can be placed on the surface 140 of the core structure 120 by using a variety of methods known to those of ordinary skill in the art, such as by using a CVD reactor. For example, to place a Si nanowire on the core structure 120, a CVD reactor can be equipped with inlets into which silane ($SiH_4$) gas can be introduced. The $SiH_4$ gas can then be dissociated in high density plasma to give rise to Si, which then dissolves through a Sn catalyst such that the Si precipitates out at the bottom of the reactor, to thereby provide nanowire growth on the core structure 120. Similarly, and as another example, germanium (Ge) nanowires can be also be grown on the core structure 120 by using germane ($GeH_4$), which dissociates in the high density plasma to form Ge and thereby lead to Ge nanowire growth.

As noted, in some embodiments of the presently-disclosed anode materials 10, 110, each nanostructure 30, 130 is placed on the core structure 20, 120 and is spaced at a predetermined distance from adjacent nanostructures 30, 130, as shown in FIGS. 1A-1B and in FIGS. 2A-2B. The distances between adjacent nanostructures 30, 130 can be controlled by varying the conditions under which the nanostructures 30, 130 are placed on the core structures 20, 120, including, for example, the deposition power, the temperature of the substrate, the chamber pressure of the CVD chamber (e.g., the chamber pressure of the CVD reactor utilized for the deposition of Si and Ge), and the hydrogen flow rate of a particular system (e.g., the system utilized for placing Sn nanoclusters on $SiO_2$ nanowires). By varying these conditions, each nanostructure 30, 130 can be spaced in a particular manner on the surface 40,140 of the core structure 20, 120 and can be evenly spaced across the surface 40,140 of the core structure 20, 120.

Referring still to FIGS. 1A-1B and FIGS. 2A-2B, each nanostructure 30, 130 has a diameter (d), there is a distance (W) between adjacent nanostructures 30, 130, and this distance (W) between the adjacent nanostructures 30, 130 is maintained as the nanostructures 30, 130 are placed along the surfaces 40, 140 of the core structures 20, 120. In some embodiments, the distance between the nanostructures 30, 130 is about 1 to about 2.5 times the diameter of the nanostructure 30, 130. In some embodiments, the distance between each nanostructure 30, 130 is about 1, about 1.1, about 1.2, about 1.3, about 1.4, about 1.5, about 1.6, about 1.7, about 1.8, about 1.9, about 2.0, about 2.1, about 2.2, about 2.3, about 2.4, or about 2.5 times the diameter of the nanostructure 30, 130. In some embodiments, the diameter of each nanostructure 30, 130 is about 50 nm.

Without wishing to be bound by any particular theory, it is believed that by spacing each nanostructure 30, 130 at a predetermined distance from adjacent nanostructures 30, 130, the nanostructures 30, 130 are able to accommodate an expansion in volume without forming agglomerates. Previous studies have shown that anode materials that are comprised of only a pure metal oxide nanowire core structure undergo large volume changes during Li alloying and de-alloying. Over a number of lithiation and delithiation cycles, the metal atoms in these nanowires expand and coalesce with nearby metal atoms, which leads to the formation of large agglomerates and thereby reduces the available Li-ion storage capacity of the materials and eventually destroys the morphology and conductivity of the anode materials. It has been determined, however, that by including nanostructures 30, 130 (i.e., nanoclusters or nanowires) on the core structures 20, 120 of the anode materials 10, 110 and spacing the nanostructures 30, 130 at a predetermined distance from one another, anode materials can be provided that not only possess an increased surface area for Li alloying and de-alloying, but are also able to retain a high-capacity retention and coulombic efficiency after a number of charge/discharge cycles as the morphology and conductivity of these anode materials are maintained during repeated lithiation and delithiation cycles. Furthermore, due to the placement of the nanostructures 30, 130, on the surfaces 40, 140 of the cores structures 20, 120, which allows for electrons to travel very short distances into the core structures 20, 120, it is believed that faster electron transport can be achieved through the underlying core structures 20, 120 and thus allow for efficient Li alloying and de-alloying.

In some embodiments, the plurality of nanostructures 30, 130 are placed on the core structures 20, 120 of the anode materials 10, 110 such that the distance between adjacent nanostructures 30, 130 is sufficient to accommodate the volume expansion that a particular material will undergo during lithiation. By taking into account the volume expansion a particular material will undergo during lithiation, the nanostructures 30, 130 can thus be sufficiently spaced on the core structures 20, 120, and thereby prevent agglomeration and retain the capacity of the anode material 10, 110. For example, in some embodiments where the plurality of nanostructures 30, 130 are comprised of tin, the tin nanostructures can be placed on the core structures 20, 120 such that the distance between each tin nanostructure is about 1.4 times the diameter of the nanostructure. As another example, in other embodiments where the plurality of nanostructures 30, 130 are comprised of silicon, the distance between each nanostructure is about 1.71 times the diameter of the silicon nanostructures. As yet another example, in yet a further embodiment where the nanostructures 30, 130 are comprised of germanium, the distance between each germanium nanostructure is about 1.65 times the diameter of the nanostructure.

The presently-disclosed subject matter is further illustrated by the following specific but non-limiting examples. Some of the following examples are prophetic, notwithstanding the numerical values, results and/or data referred to and contained in the examples.

EXAMPLES

Example 1

Anode Materials Including Tin Oxide Nanowires and Tin Nanoclusters

Materials and Methods for Example 1

To examine the ability of a material including a core structure having a plurality of nanostructures placed on its surface to function as an anode material, tin oxide ($SnO_2$) nanowires were first synthesized by reacting tin (Sn) metal powders directly in the gas phase with oxygen containing plasma without the use of a substrate in a microwave (MW) plasma jet reactor at a power of 2 kW [19]. The as-synthesized $SnO_2$ nanowires were then purified by dispersing them in 1-methoxy 2-proponal followed by gravity sedimentation. Pure $SnO_2$ nanowires were subsequently exposed to $H_2$ plasma in a microwave chemical vapor deposition reactor at a power of 500 W for 15 minutes to obtain the Sn-nanocluster-covered $SnO_2$ nanowires.

To characterize the Sn-nanocluster-covered $SnO_2$ nanowires, all the synthesized materials were examined using a field emission-scanning electron microscope (FE-SEM; FEI Nova 600), x-ray diffraction (XRD; Bruker D8 Discover) and transmission electron microscopy (TEM; Tecnai F20 FEI TEM with a Gatan 2002 GIF system).

Further, the Sn-nanocluster-covered SnO$_2$ nanowires were also examined for their ability to function as an anode material for a lithium-ion (Li-ion) battery. In this regard, material for the working electrode was prepared by spreading the SnO$_2$ nanowire-based materials uniformly on a platinum foil by applying pressure. Similar results were obtained when electrodes were made by mixing the SnO$_2$ nanowire-based material with carbon black and a poly(vinylidene fluoride) binder in a weight ratio of 80:10:10 respectively in a 1-methyl-2-pyrrolidone solvent and then spreading it onto platinum foil. A three electrode cell with the SnO$_2$ nanowire electrode as the working electrode and lithium foil as both the reference and auxiliary (counter) electrodes was used. The electrolyte consisted of 1M LiPF$_6$ in a 1:1 (volume) mixture of ethylene carbonate (EC) and dimethyl carbonate (DMC). The electrochemical measurements were performed using eDAQ e-corder and potentiostat in the voltage range of 0 to 2.2V.

Results and Discussion for Example 1

Figure 3:
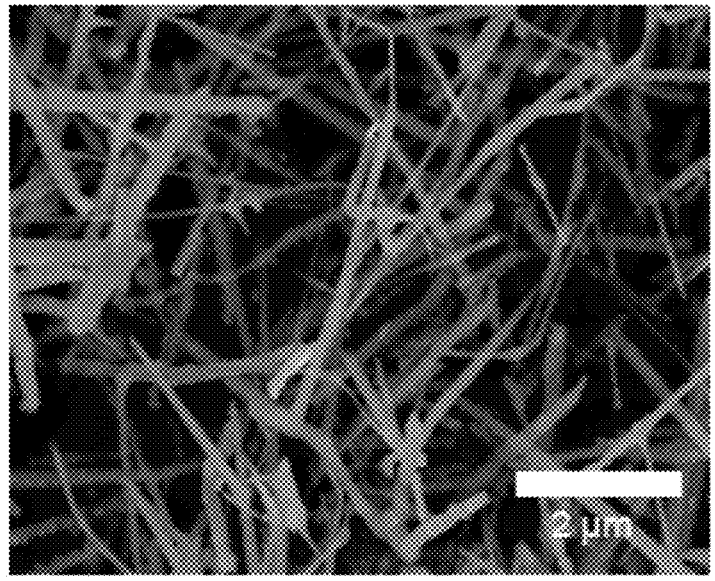
FIG. 3 is a low-magnification scanning electron microscopy (SEM) image of a network of exemplary anode materials comprising a $SnO_2$ nanowire core structure and a plurality of Sn nanoclusters on the surface of the $SnO_2$ nanowires.
Figure 4:
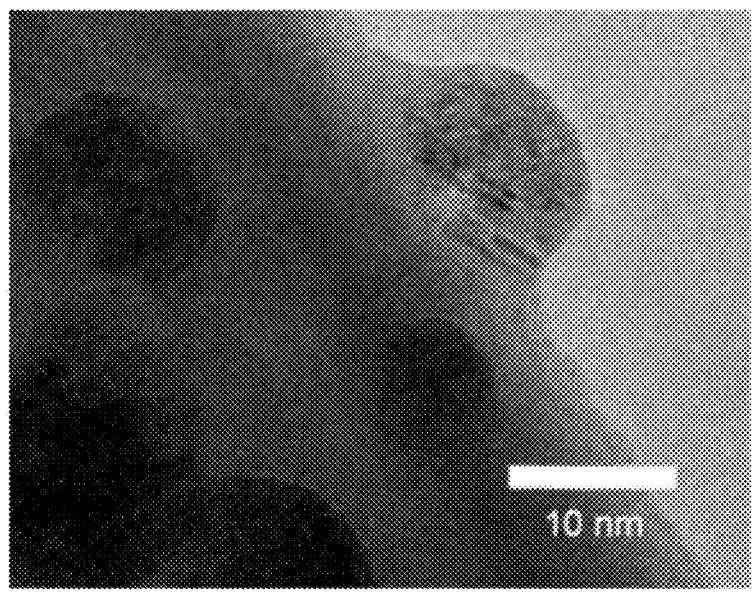
FIG. 4 is a high-resolution transmission electron microscopy (TEM) image of an exemplary anode material comprising a $SnO_2$ nanowire core structure and a plurality of Sn nanoclusters on the surface of the $SnO_2$ nanowire, and showing well-spaced Sn nanoclusters on the surface of the $SnO_2$ nanowire.

The design principle for the proposed hybrid structures was that the SnO$_2$ nanowires were covered with Sn nanoclusters with spacing of approximately 1.4 times the diameter of each nanocluster. The spacing was included to accommodate the volume expansion of the Sn nanoclusters during alloying to thereby prevent Sn agglomeration. The faster electron transport through the underlying SnO$_2$ nanowires was expected to allow for efficient Li alloying and de-alloying while the exposed Sn nanoclusters and SnO$_2$ nanowire surfaces served as Li alloying sites. The SEM image in FIG. 3 shows the as-synthesized, SnO$_2$ nanowires with diameters ranging from 50-200 nm and microns in length. The as-synthesized SnO$_2$ nanowires were then reduced using H$_2$ plasma exposure producing nanometer-sized Sn clusters on the nanowire surfaces. The H$_2$ plasma exposure also reduced the nanowire diameters from the 50-200 nm range to a 30-100 nm range. (See FIG. 4 for a high resolution TEM image showing a SnO$_2$ nanowire covered with 15 nm sized, crystalline Sn nanoclusters evenly spaced from each other).

Figure 5A:
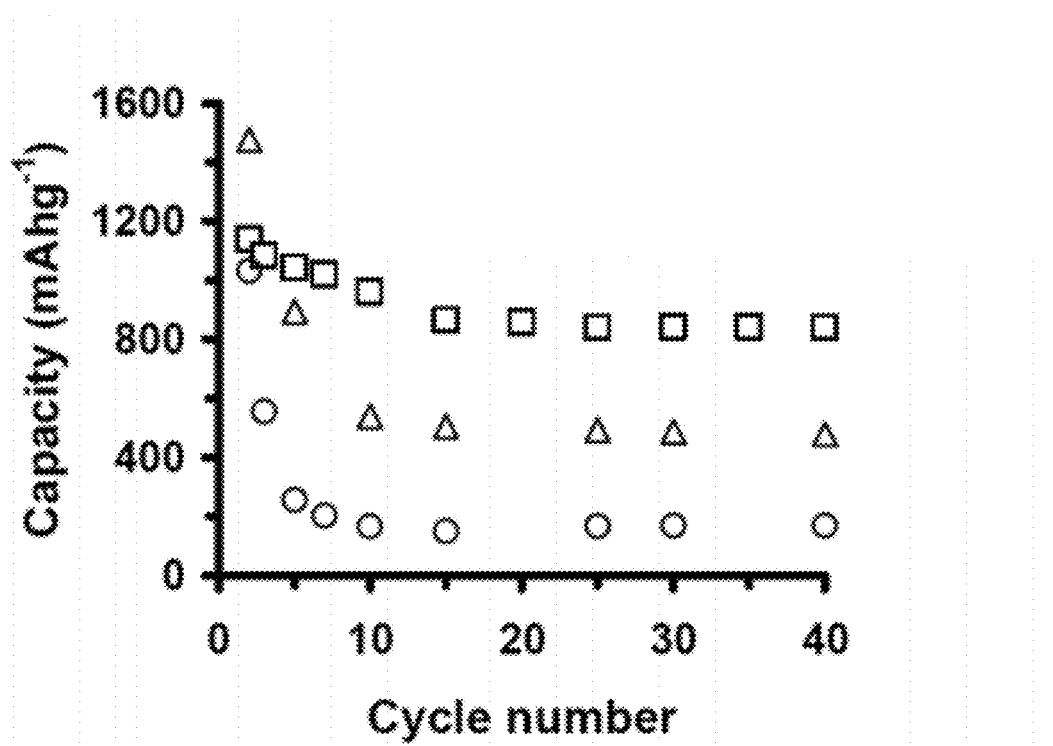
FIGS. 5A and 5B are graphs showing electrochemical measurements of $SnO_2$ nanowire-based materials including: a graph showing the cyclic performance comparison of Sn nanocluster-covered $SnO_2$ nanowires (□), $SnO_2$ nanowires with dispersed Sn metal (Δ), and pure $SnO_2$ nanowires, measured between 0 to 2.2 V (FIG. 5A); and a graph showing the capacity fading (○) and the columbic efficiency (QE; Δ) for the Sn nanocluster-covered $SnO_2$ nanowires (FIG. 5B).
Figure 5B:
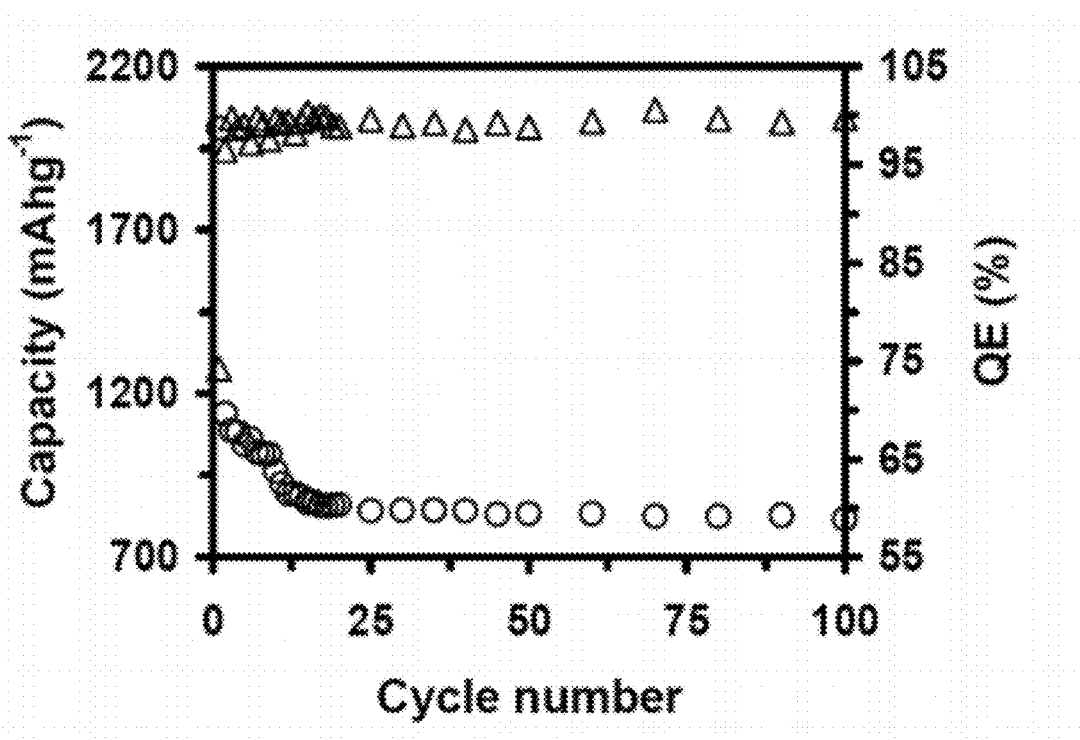

All materials systems were tested using anodic measurements over a potential window of 0 to 2.2 V (versus Li/Li$^+$). The data using pure SnO$_2$ nanowires showed a high initial capacity of 2400 mAhg$^{-1}$ but severe capacity degradation occurred within the next 15 cycles leading to a reversible capacity of 166 mAhg$^{-1}$ after 40 cycles, as shown in FIG. 5A. In comparison, Sn-nanocluster-covered SnO$_2$ nanowires exhibited a reversible capacity of 845 mAhg$^{-1}$ after 40 cycles as shown in FIG. 5B. Other types of Sn/SnO$_2$ composite nanowire systems (metal Sn nanoclusters distributed in between the SnO$_2$ nanowire networks) showed an initial capacity of 2800 mAhg$^{-1}$ with a final reversible capacity of 490 mAhg$^{-1}$ after 40 cycles. This result is similar to that obtained in prior studies using Sn/SnO$_2$ composites [18].

FIG. 5B depicts the discharge specific capacity and the columbic efficiency with cycling at 100 mAg$^{-1}$ current density, demonstrating that the mechanical stability of the material can be sustained for up to 100 cycles with an reversible capacity of 814 mAhg$^{-1}$. The hybrid structures show an initial irreversible capacity of 413 mAhg$^{-1}$ which accounts to a columbic efficiency of 74% (see the secondary axis in FIG. 5B). The columbic efficiency in the subsequent cycles is shown to be over 98%. The capacity fading at a rate of approximately 1.3% for the initial 15 cycles and approximately 0.8% after the 15$^{th}$ cycle is considerably lower than that reported for other nanoscale SnO$_2$ material systems [8,16]. Without wishing to be bound by any particular theory, it is believed that the enhanced capacity retention and coulombic efficiency can be attributed to the high surface area to volume ratio present in the hybrid materials, which increases the net amount of Li alloying and de-alloying.

Figure 6:
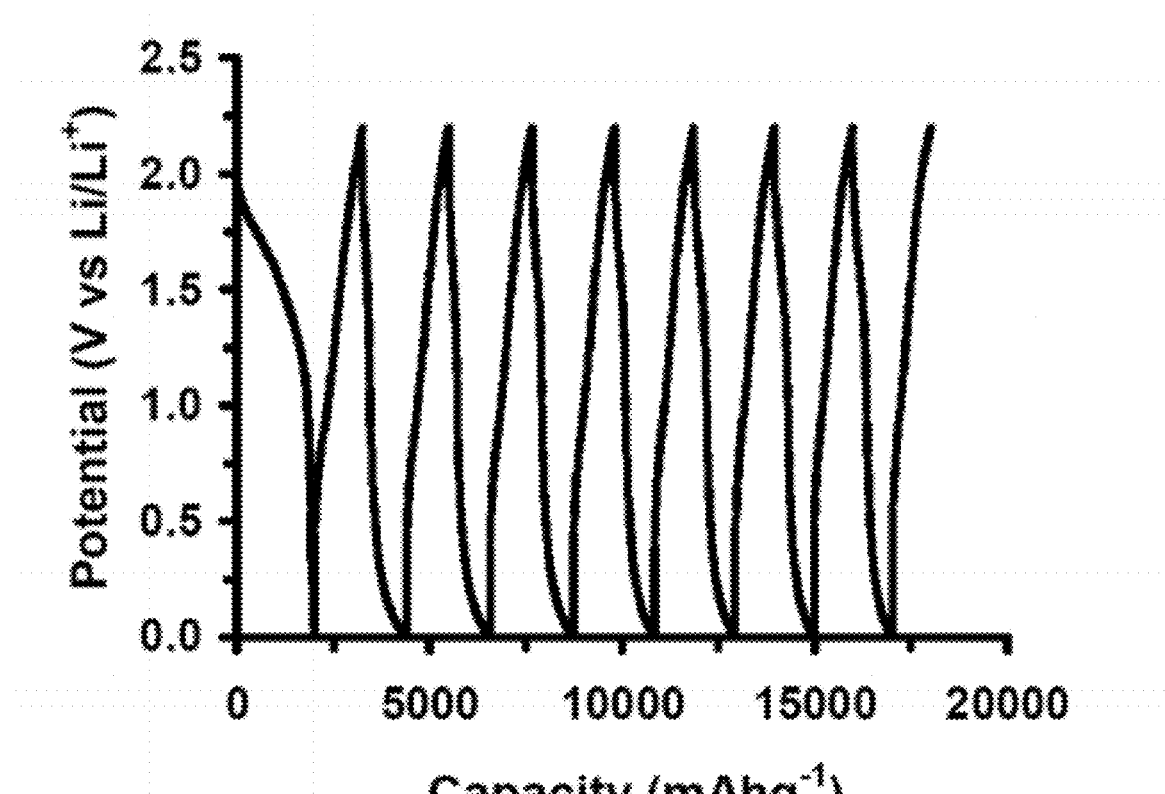
FIG. 6 is a graph showing voltage capacity curves for Sn nanocluster-covered $SnO_2$ nanowires over eight initial charge/discharge cycles between 0 to 2.2 V, which were performed at a rate of 100 $mAg^{-1}$ at room temperature.

FIG. 6 shows the initial charge and discharge curves of the hybrid SnO$_2$ structures in a potential window of 0 to 2.2 V. High discharge capacity of 2013 mAhg$^{-1}$ in the first cycle was attributed to the fact that Li intercalates into SnO$_2$ during the first cycle followed by the subsequent alloying of Li with Sn forming a Li$_x$Sn alloy, which corresponds to the plateau observed below 0.5 V in the charge/discharge curves.

For pure phase SnO$_2$ nanowires, rapid capacity degradation was observed with cycling and capacity retention of 166 mAhg$^{-1}$ was obtained after 40 cycles. The XRD and SEM characterization of that material after cycling showed that the SnO$_2$ NWs reduce completely to Sn while destroying the nanowire morphology. These observations about severe degradation of nanowire morphology and reduction in the capacity are consistent with prior studies involving SnO$_2$ and other metal oxide nanowires [8, 15, 16]. In some cases, the as-synthesized SnO$_2$ nanowire samples exhibited capacity retention over a range of values (166-300 mAh/g), which was possibly due to the presence of some excess Sn metal on nanowire surfaces similar to the hybrid nanowire systems. Complete reduction of the SnO$_2$ nanowires at various microwave powers yielded Sn crystals of varying diameters rather than Sn nanowires. The performance of Sn thin films as anodes has been studied before [20] and performs similarly to that of pure phase SnO$_2$ system, i.e., the capacity fades quickly to about 200 mAhg$^{-1}$ in 20 cycles.

The stability of the Sn-nanocluster-covered SnO$_2$ nanowires can be explained with the following Li alloying mechanism [21]:

$$SnO_2 + 2Li^+ + 2e^- \rightarrow SnO + Li_2O \quad (1)$$

$$SnO + 2Li^+ + 2e^- \rightarrow Sn + Li_2O \quad (2)$$

$$Sn + xLi^+ + xe^- \leftrightarrow Li_xSn \, (0 \leq x \leq 4.4) \quad (3)$$

The reaction of SnO$_2$ with Li ions, electrolyte decomposition and solid electrolyte interface formation are believed to be the reasons for large irreversible capacity during the first cycle. In the case of pure SnO$_2$ materials including nanowires, the reduction of SnO$_2$ to Sn takes place in the first cycle. Repeated cycling induces enormous volume changes in Sn which tends to expand and coalesce with the nearby Sn atoms, leading to large agglomerates, thus reducing the available surface area for the Li-ion storage capacity of the material and eventually destroys the pure oxide nanowire structure.

Figure 7A:
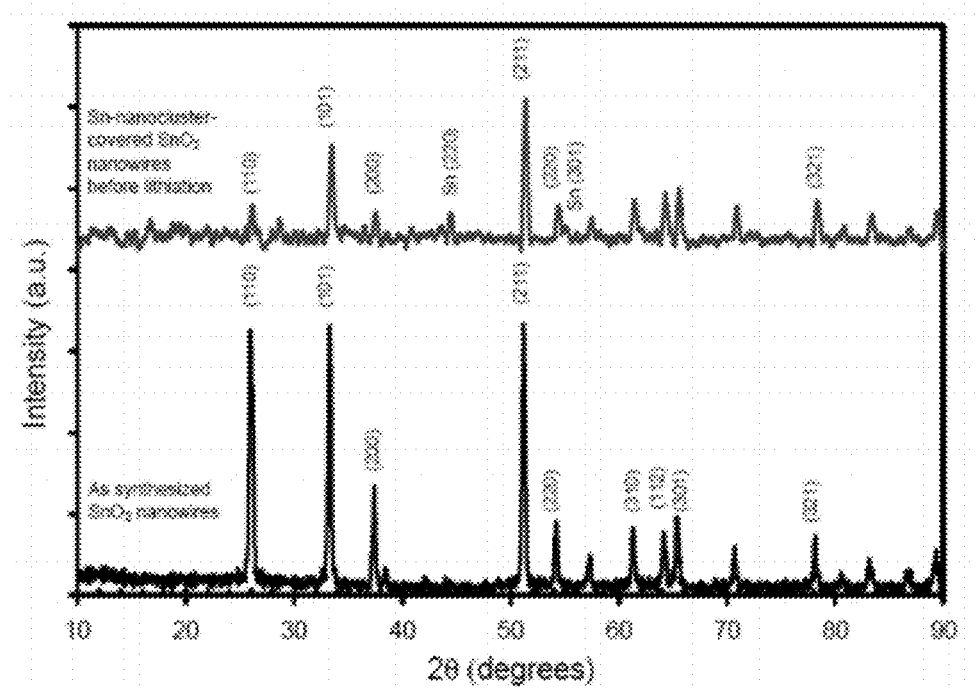
FIGS. 7A-7B are X-ray diffraction spectra showing the spectra of $SnO_2$ nanowires and Sn nanocluster-covered $SnO_2$ nanowires before lithiation (FIG. 7A) and the spectra of $SnO_2$ nanowires and Sn nanocluster-covered $SnO_2$ nanowires after lithiation (FIG. 7B).
Figure 7B:
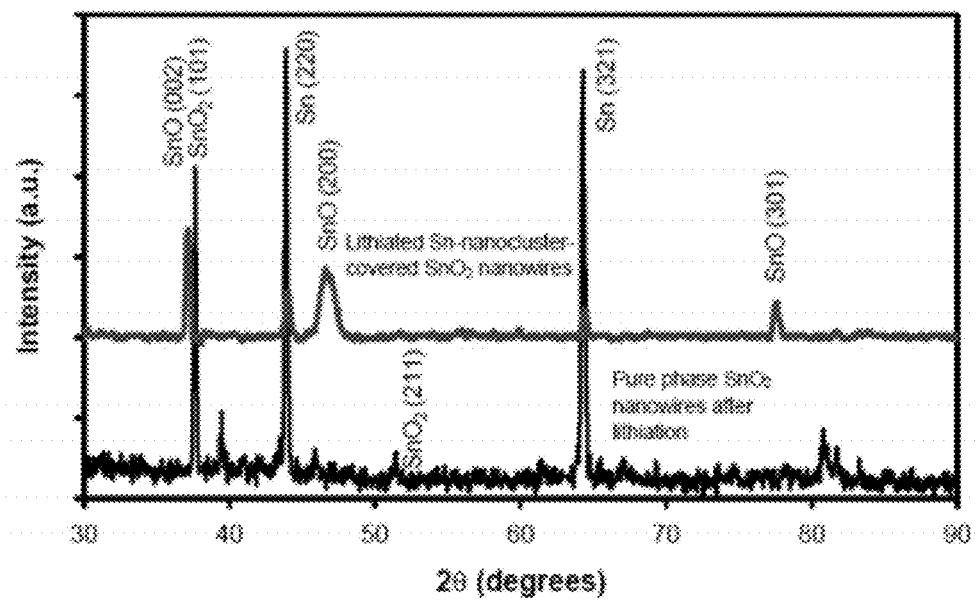
Figure 8:
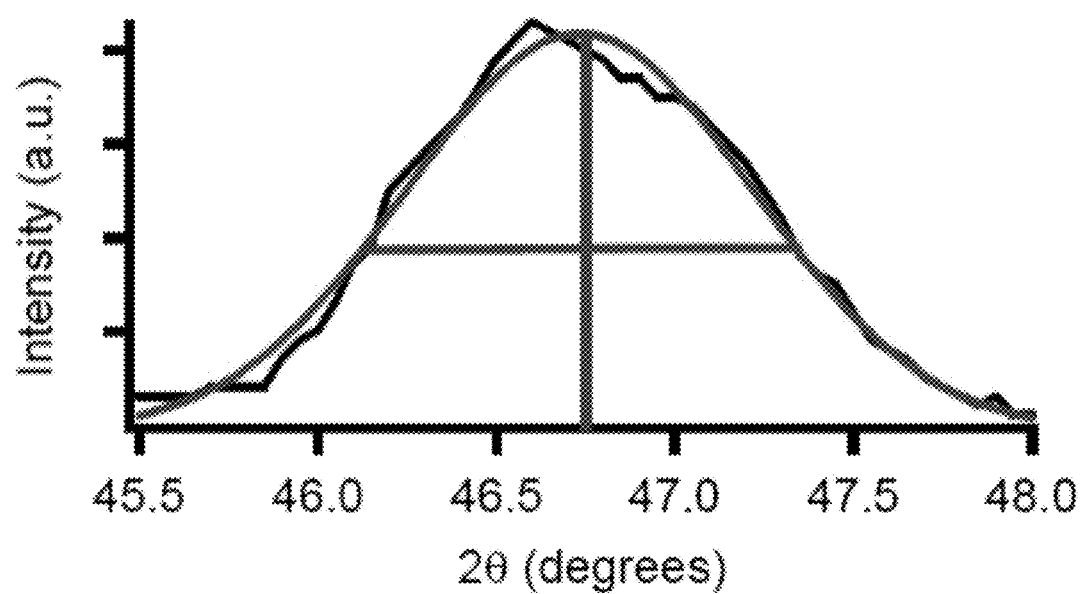
FIG. 8 is a graph showing the Gausian fit to the SnO(200) peak from the X-ray diffraction spectra of a Sn nanocluster-covered $SnO_2$ nanowire, and indicating the peak position and full width at half maximum.

In the case of the hybrid structures involving Sn-nanocluster-covered SnO$_2$ nanowires, however, the spacing between the nanoclusters clusters was adequate enough to accommodate the volume changes induced by the lithiation process, preventing agglomeration and thus explaining the observed high capacity even after hundred charge/discharge cycles. Of course, the underlying nanowires must also retain both their morphology and conductivity for the observed stability with cycling, so the XRD spectra were obtained for both pure phase and Sn-nanocluster-covered SnO$_2$ nanowire samples after they were subjected to several charge/discharge cycles. FIG. 7A shows a rutile phase for SnO$_2$ for both as-prepared samples of pure phase SnO$_2$ nanowires and Sn-nanocluster-covered SnO$_2$ nanowires. FIG. 7B shows XRD spectra of both pure phase and Sn-nanocluster-covered SnO$_2$ nanowires after 25 and 100 charge and discharge cycles, respectively. After lithiation, the majority of the SnO$_2$ nanowires were completely converted into a Sn phase in the case of pure SnO$_2$ nanowire samples, along with unreacted SnO$_2$ phases. In comparison, the Sn-nanocluster-covered SnO$_2$ nanowires showed the presence of a SnO phase in addition to Sn phases after hundred charge/discharge cycles. The peak shifts of the different peaks in Table 1 towards the lower diffraction angles indicate that the lithium intercalation increases the lattice plane spacing of these materials and also the probable presence of Li-ions inside the structure. The broad peaks also indicate the presence of small domains of Sn and SnO phases after the lithiation process. Similar shifts are shown in FIG. 8, which is the Gaussian fit to the SnO(200) peak indicating the peak position and the FWHM.

TABLE 1

Full width at half maximum positions of different peaks for the lithiated Sn-nanocluster-covered $SnO_2$ nanowires.

| Peak Positions | FWHM (Full width at half maximum) | Powder peak positions | Actual peak positions |
|---|---|---|---|
| SnO(002) | 0.328 | 37.15 | 37.10 |
| SnO(200) | 1.143 | 47.80 | 46.80 |
| SnO(301) | 0.442 | 77.85 | 77.55 |
| Sn(220) | 0.363 | 43.97 | 44.00 |
| Sn(321) | 0.390 | 64.74 | 64.40 |

The observed, small peak shifts with both SnO (301) and SnO (002) peaks towards the lower diffraction angle indicated that the observed SnO phase can be a lithiated SnO phase. The observed capacity retention can be attributed to the presence of Sn as well as SnO phase. The SnO phase is formed as a result of the reversibility of Equation 3 in which the nanoscale Sn domains can decompose the $Li_2O$ which is otherwise irreversible. This reversibility gives rise to the formation of SnO nanodomains from Sn nanosized particles during the de-lithiation process. Such nanodomains are clearly seen to be present in an amorphous matrix within the nanowires after they were subjected to hundred charge/discharge cycles (see the HR-TEM image in FIG. 9B). The reversibility of the metal particles to metal oxides by the decomposition of $Li_2O$ in nanosized domains was shown to be feasible in other reports [1,6].

Figure 9A:
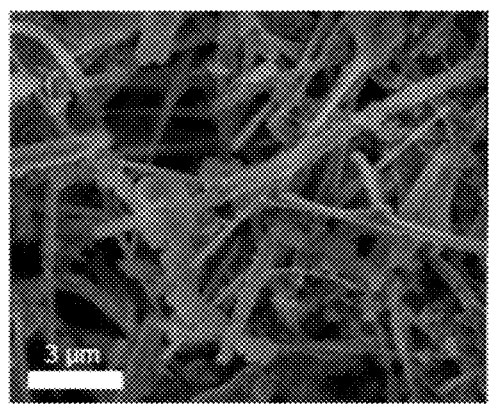
FIG. 9A-9C are images and a schematic diagram showing the characterization of an anode material comprising a $SnO_2$ nanowire core structure and a plurality of Sn nanoclusters on the surface of the $SnO_2$ nanowires, including: a SEM image of the Sn nanocluster-covered $SnO_2$ nanowire (FIG. 9A); a high-resolution TEM image of the Sn nanocluster-covered $SnO_2$ nanowires (FIG. 9B); and a schematic diagram showing reversible lithium alloying and de-alloying steps in the Sn nanocluster-covered $SnO_2$ nanowires (FIG. 9C).
Figure 9B:
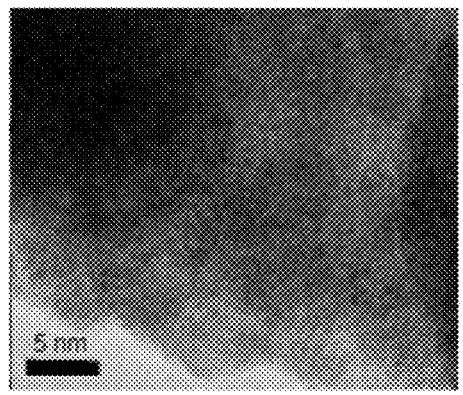
Figure 9C:
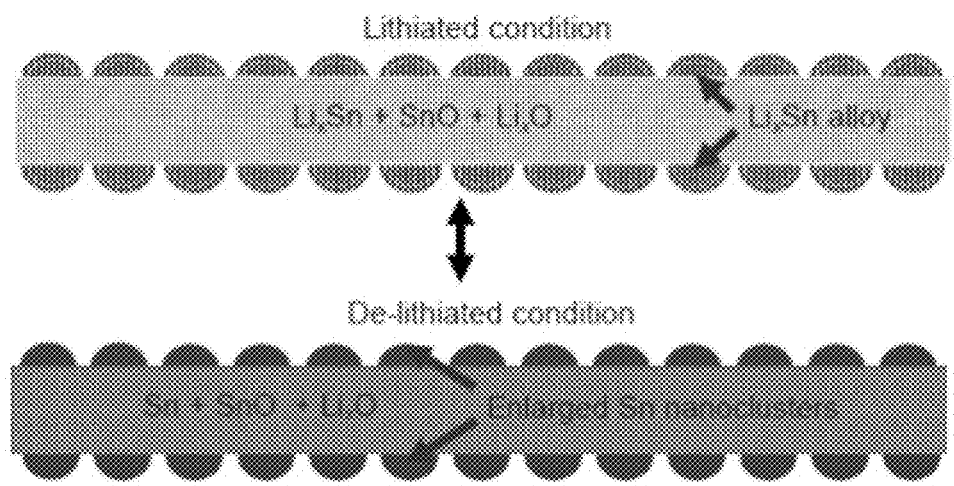
Figure 10A:
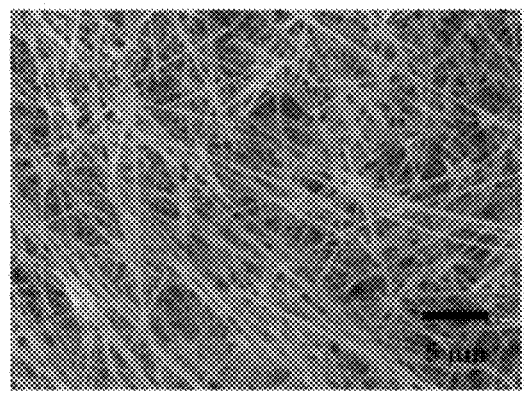
FIGS. 10A-10C are SEM images of pure $SnO_2$ nanowires prior to lithiation (FIG. 10A) and pure $SnO_2$ nanowires after 25 cycles of lithiation and de-lithiation (FIGS. 10B and 10C).
Figure 10B:
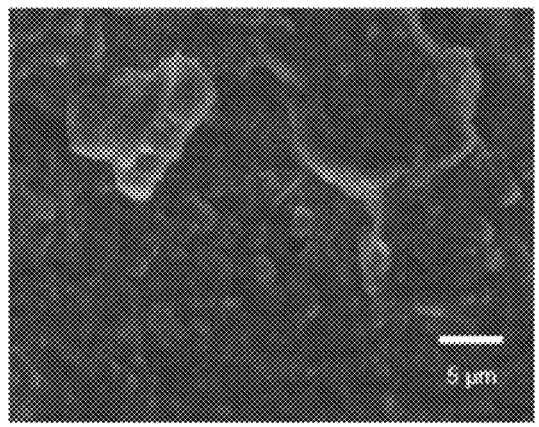
Figure 10C:
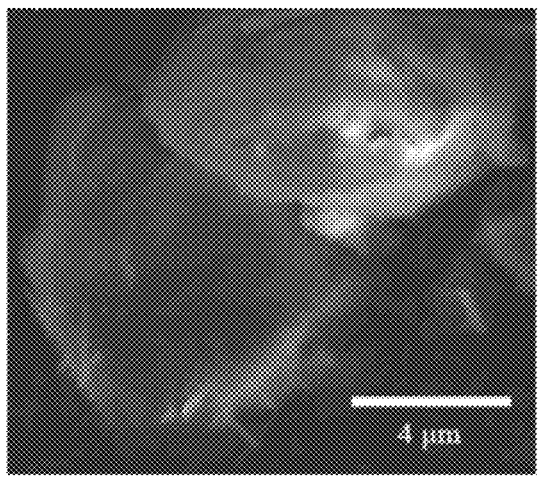

The SEM image in FIG. 9A distinctly shows unblemished hybrid nanowires after hundred charge/discharge cycles. The image in FIG. 9A further shows the enlarged Sn nanoclusters on the nanowire periphery, which was due to the volume expansion of Sn as well as the Sn segregation from the interior of the nanowire. The proposed reversibility with the Sn nanocluster covered $SnO_2$ nanowires is schematically illustrated in FIG. 9C. As shown in that schematic, during the lithiation process, the nanowire is composed of SnO and $Li_xO$, in which SnO promotes the electronic conductivity while the $Li_xO$ phase promotes the Li-ion migration during Li alloying and de-alloying and prevents further Sn agglomeration inside the nanowire [18]. Hence, the nanowire morphology is retained after several cycles avoiding major structural changes, such as those observed when pure $SnO_2$ nanowires undergo repeated lithiation cycles (see FIGS. 10A-10C). The SnO phase can also arise due to the slightly reversible nature of the reaction in Equation (2) during the dealloying process; the faster kinetics for SnO formation compared to $SnO_2$ [22,23].

In summary, $SnO_2$ nanowires decorated with well-separated Sn nanoclusters exhibit a reversible storage capacity greater than 800 mAhg$^{-1}$ over 100 cycles. These hybrid structures, with improved stable capacity, better relieve the stresses associated with volume changes, as compared to pure phase $SnO_2$ nanowires. The capacity fading after the first few cycles is low at less than 1% per cycle, and post-lithiated samples show the intact hybrid structure after 100 cycles.

Example 2

Anode Materials Including Carbon Nanotubes and Silicon or Germanium Nanowires

To synthesize an anode material where the core structure is a carbon nanotube (CNT) and silicon (Si) or germanium (Ge) nanowires are placed on the surface of the CNT and spaced at predetermined distances from adjacent nanowires, CNTs are first obtained from commercially available sources. Si and Ge nanowire growth on the CNTs is then obtained using a CVD reactor. To synthesize Si nanowires on the CNTs, the reactor is equipped with inlets for the handling of silane ($SiH_4$) gas. The $SiH_4$ is disassociated in high density plasma to give rise to Si, which then dissolves through a Sn catalyst and precipitates out at the bottom of the reactor to lead to nanowire growth. Similarly, for the Ge nanowire growth on the CNTs, germane ($GeH_4$) is used, which, in the presence of high-density plasma, disassociates to form Ge and hence, leads to nanowire growth. In these anode materials, high capacity can be obtained from the Si and Ge materials, whereas the stability can be obtained from the underlying base CNTs.

Example 3

Anode Materials Including Carbon Microtubes and Silicon or Germanium Nanowires

To synthesize an anode material where the core structure is a carbon microtube (CMT) and silicon (Si) or germanium (Ge) nanowires are placed on the surface of the CNT and spaced at predetermined distances from adjacent nanowires, CMTs can first be synthesized in large quantities on silicon substrates using a CVD reactor. Briefly, CMTs are synthesized on 6 inch silicon wafers in a metal organic chemical vapor deposition reactor at a substrate temperature of 700° C. The chamber pressure is set to 50 torr with a carrier gas (nitrogen) flow rate of 10 sccm and the precursor, trimethyl gallium is set at 0° C. A 10-minute experiment covers the entirety of the silicon wafer with CMTs and the mass of the sample obtained for each run is more than 200 mg. CMTs are then scraped off the silicon wafers and dispersed in aquaregia to dissolve off the gallium. Aquaregia is freshly prepared by making a solution of concentrated nitric acid (Fisher scientific) and concentrated hydrochloric acid (Fisher scientific) in a volumetric ratio of 1:3. The CMTs are allowed to stand in the acid solution for an hour before removing the settled deposit of the CMTs from the solution. The CMTs are then washed with water and subsequently dried at 200° C. for a couple of hours.

Si and Ge nanowire growth on the as-synthesized CMTs is then obtained using a CVD reactor. To synthesize Si nanowires on the CMTs, the reactor is equipped with inlets for the handling of silane ($SiH_4$) gas. The $SiH_4$ is disassociated in high density plasma to give rise to Si, which then dissolves through a Sn catalyst and precipitates out at the bottom of the reactor and leads to nanowire growth. Similarly, for the Ge nanowire growth on the CMTs, germane ($GeH_4$) is used, which, in the presence of high-density plasma, disassociates to form Ge and hence, leads to nanowire growth. In these anode materials, high capacity can be obtained from the Si and Ge materials, whereas the stability can be obtained from the underlying base CMTs.

Example 4

Anode Materials Including Molybdenum Oxide or Tungsten Trioxide Nanowires and Silicon or Germanium Nanowires To synthesize an anode material where the core structure is a metal oxide nanowire comprised of molybdenum oxide ($MoO_3$) or tungsten trioxide ($WO_3$) that include silicon (Si) or germanium (Ge) nanowires placed on the surface of the metal oxide nanowires and spaced at predetermined distances from adjacent nanowires, metal oxide nanowire arrays can be grown directly onto conducting stainless steel substrates, which gives rise to good conduction using a hot filament CVD reactor. In this system, the substrates are then placed at a distance from the hot metal filament. The metal oxide species (vapor phase) are then transported using oxygen, and are subsequently deposited onto the substrate. The nanowire density, nanowire morphology and the nanowire diameter can be controlled by the substrate temperature and the oxygen flow into the system. Si and Ge nanowire growth on the metal oxide nanowires can then be obtained using a CVD reactor. To synthesize Si nanowires on these metal oxide nanowires, the reactor is equipped with inlets for the handling of silane ($SiH_4$) gas. The $SiH_4$ is disassociated in high density plasma to give rise to Si, which then dissolves through a Sn catalyst and precipitates out at the bottom of the reactor and leads to nanowire growth. Similarly, for the Ge nanowire growth on the metal oxide nanowires, germane ($GeH_4$) is used, which, in the presence of high-density plasma, disassociates to form Ge and hence, leads to nanowire growth. In these anode materials, high capacity can be obtained from the Si and Ge materials, whereas the stability can be obtained from the underlying metal oxide nanowires.

Throughout this document, various references are mentioned. All such references are incorporated herein by reference, including the references set forth in the following list:

REFERENCES

1. Poizot P, Laruelle, S, Grugeon S, Dupont L, Tarascon J M. *Nature* 2000, 407, 496.
2. Aricó, A S, Bruce P, Scrosati B, Tarascon, J M, Schalkwijk W V. *Nat. Mater.* 2005, 4, 366.
3. Taberna P L, Mitra S, Poizot P, Simon P, Tarascon J M. *Nat. Mater.* 2006, 5, 567.
4. Chan C K, Peng H, Liu G, McIlwrath K, Zhang X F, Huggins R A, Cui Y. *Nature Nanotech.* 2008, 3, 31.
5. Nam K T, Kim D W, Yoo P J, Chiang C Y, Meethong N, Hammond P T, Chiang Y M, Belcher A M. *Science* 2006, 312, 885.
6. Li Y, Tan B, Wu Y. *Nano Lett.* 2008, 8, 265.
7. Chen J, Xu L, Li W, Gou X. *Adv. Mater.* 2005, 17, 582.
8. Ying Z, Wan Q, Cao H, Song Z T, Feng S L. *Appl. Phys. Lett.* 2005, 87, 113108.
9. Idota Y, Kubota T, Matsufuji A, Maekawa Y, Miyasaka T. *Science* 1997, 276, 1395.
10. Kim E, Son D, Kim T G, Cho J, Park B, Ryu K S, Chang S H. *Angew. Chem. Int. Ed.* 2004, 43, 5987.
11. Winter M, Besenhard J O. *Electrochim. Acta* 1999, 45, 31.
12. Derrien G, Hassoun J, Panero S, Scrosati B. *Adv. Mater.* 2007, 19, 2336.
13. Wachtler M, Winter M, Besenhard J O. *J. of Power Sources* 2002, 105, 151.
14. Boukamp B A, Lesh G C, Huggins R A. *J. Electrochem. Soc.* 1981, 128, 725.
15. Kim D W, Hwang I S, Kwon S J, Kang H Y, Park K S, Choi Y J, Choi K J, Park J G. *Nano Lett.* 2007, 7, 3041.
16. Park M S, Wang G X, Kang Y M, Wexler D, Dou S X, Liu H K. *Angew. Chem. Int. Ed.* 2007, 46, 750.
17. Wang Y, Lee J Y. *J. Phys. Chem. B* 2004, 108, 17832.
18. Sivashanmugam A, Prem Kumar T, Renganathan N G, Gopukumar S, Wohlfahrt-Mehrens M, Garche J. *J. Power Sources* 2005, 144, 197.
19. Kumar V, Kim J H, Pendyala C, Chernomordik B, Sunkara M K. *J. Phys. Chem. C* 2008, 112, 17750.
20. Morimoto H, Tobishima S, Negishi H. *J. of Power Sources* 2005, 146, 469.
21. Li N, Martin C R. *J. Electrochem. Soc.* 2001, 148, A164.
22. Sandu I, Brousse T, Schleich D M, Danot M *J. Solid State Chem.* 2006, 179, 476.
23. Courtney, I. A.; Dunlap, R. A.; Dahn, J. R. *Electrochim. Acta* 1999, 45, 51.

One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to understood therefrom, for modifications will become apparent to those skilled in the art upon reading this disclosure and may be made without departing from the spirit or scope of the presently-disclosed subject matter.

What is claimed is:

1. An anode material for a lithium-ion battery, comprising:
an elongated core structure capable of forming an alloy with lithium; and
a plurality of nanostructures placed on a surface of the core structure and arrayed around the circumference of the core structure, each nanostructure capable of forming an alloy with lithium and each nanostructure spaced at a predetermined distance from each other nanostructures, and wherein the plurality of nanostructures are comprised of silicon, germanium, tin, or a silicon and germanium alloy.

2. An anode material for a lithium-ion battery, comprising:
an elongated core structure capable of forming an alloy with lithium; and
a plurality of nanostructures, selected from a plurality of nanoclusters or a plurality of nanowires, placed on a surface of the core structure and arrayed around the circumference of the core structure, each nanostructure capable of forming an alloy with lithium and each nanostructure spaced at a predetermined distance from each other nanostructures.

3. The anode material of claim 2, wherein the plurality of nanostructures comprises a plurality of nanowires.

4. The anode material of claim 1, wherein the plurality of nanostructures are comprised of tin and wherein the distance between each nanostructure is about 1.4 times the diameter of the tin nanostructure.

5. The anode material of claim 1, wherein the plurality of nanostructures are comprised of silicon and wherein the distance between each silicon nanostructure is about 1.71 times the diameter of the nanostructure.

6. The anode material of claim 1, wherein the plurality of nanostructures are comprised of germanium and wherein the distance between each germanium nanostructure is about 1.65 times the diameter of the nanostructure.

7. The anode material of claim 1, wherein the core structure is a metal oxide nanowire comprised of tin oxide, tungsten trioxide, or molybdenum oxide.

8. The anode material of claim 2, wherein the core structure is a carbon nanotube.

9. The anode material of claim 2, wherein the core structure is a carbon microtube.

10. The anode material of claim 2, wherein the core structure comprises a tin oxide nanowire and wherein the nanostructures comprise tin nanoclusters.

11. An anode material for a lithium ion battery, comprising:
a metal oxide nanowire capable of forming an alloy with lithium; and
a plurality of metal nanostructures placed on the surface of the metal oxide nanowire and arrayed around the circumference of the metal oxide nanowire, each metal nanostructure capable of forming an alloy with lithium and each metal nanostructure spaced at a predetermined distance from each other metal nanostructure.

12. The anode material of claim 11, wherein the distance between the metal nanostructures is about 1 to about 2.5 times a diameter of the nanostructure.

13. The anode material of claim 11, wherein a diameter of each nanostructure is less than about 50 nm.

14. The anode material of claim 11, wherein the plurality of metal nanostructures comprises a plurality of metal nanoclusters.

15. The anode material of claim 11, wherein the plurality of metal nanostructures comprises a plurality of metal nanowires.

16. The anode material of claim 11, wherein the metal oxide nanowire is comprised of tin oxide.

17. The anode material of claim 11, wherein the metal nanostructures comprise tin nanoclusters.

18. The anode material of claim 2, wherein the plurality of nanostructures comprises a plurality of nanoclusters.

* * * * *